(12) United States Patent
Lazic

(10) Patent No.: US 10,721,390 B2
(45) Date of Patent: Jul. 21, 2020

(54) FOCUS PULLING WITH DISTANCE INFORMATION FROM A SECONDARY CAMERA SYSTEM

(71) Applicant: Moonlightning Industries AB, Stockholm (SE)

(72) Inventor: Miko Lazic, Stockholm (SE)

(73) Assignee: Moonlightning Industries AB (SE)

(*) Notice: Subject to any disclaimer, the term of this patent is extended or adjusted under 35 U.S.C. 154(b) by 49 days.

(21) Appl. No.: 16/094,179

(22) PCT Filed: Apr. 11, 2017

(86) PCT No.: PCT/SE2017/050359
§ 371 (c)(1),
(2) Date: Oct. 16, 2018

(87) PCT Pub. No.: WO2017/184056
PCT Pub. Date: Oct. 26, 2017

(65) Prior Publication Data
US 2019/0132527 A1 May 2, 2019

(30) Foreign Application Priority Data

Apr. 18, 2016 (SE) ...................................... 1650515

(51) Int. Cl.
*H04N 5/232* (2006.01)
*G03B 13/18* (2006.01)
(Continued)

(52) U.S. Cl.
CPC ......... *H04N 5/232127* (2018.08); *G03B 3/10* (2013.01); *G03B 13/18* (2013.01);
(Continued)

(58) Field of Classification Search
CPC ......... H04N 5/232127; H04N 5/23212; H04N 5/247; H04N 5/232933; H04N 2013/0081;
(Continued)

(56) References Cited

U.S. PATENT DOCUMENTS 7,071,985 B1 * 7/2006 Onoda ...................... G02B 7/36
348/349
8,243,123 B1 8/2012 Geshwind et al.
(Continued)

FOREIGN PATENT DOCUMENTS

EP 0751689 A2 1/1997
EP 2846531 A1 3/2015
(Continued)

OTHER PUBLICATIONS

Search Report, Application No. 17786245.5, dated Nov. 15, 2019, European Patent Office, Munich Germany.
(Continued)

*Primary Examiner* — Timothy J Henn
(74) *Attorney, Agent, or Firm* — Burr & Forman LLP; Jeffrey H. Kamenetsky

(57) ABSTRACT

A method for switching focus between objects found simultaneously in an image area from a main camera where the focus of the main camera and a switch between different focus distances is controlled by a remote follow focus unit. A secondary system and a computer system are used to measure the distance to the first and second object simultaneously and continuously. Distance information from the secondary system regarding distance to the first object is used by the follow focus unit as a focus distance to set the focus of the main camera on the first object. Distance information from the secondary system regarding distance to the second object is used by the follow focus unit as a focus
(Continued)

distance to switch the focus of the main camera from the first object to the second object. The secondary system and the computer system obtain distance information using a secondary camera system.

22 Claims, 2 Drawing Sheets

(51) Int. Cl.
G03B 13/36 (2006.01)
H04N 5/247 (2006.01)
G03B 3/10 (2006.01)

(52) U.S. Cl.
CPC ......... *G03B 13/36* (2013.01); *H04N 5/23212* (2013.01); *H04N 5/232933* (2018.08); *H04N 5/247* (2013.01)

(58) Field of Classification Search
CPC ......... H04N 5/23203; H04N 5/232121; H04N 13/356; H04N 13/16; G03B 3/10; G03B 13/36; G03B 13/18; G03B 13/20; G03B 2213/00; G08B 13/19641; G08B 13/19645
See application file for complete search history.

(56) References Cited

U.S. PATENT DOCUMENTS

| | | |
|---|---|---|
| 2008/0169929 A1 | 7/2008 | Albertson et al. |
| 2008/0225234 A1 | 9/2008 | Bauer et al. |
| 2009/0074393 A1* | 3/2009 | Park .................. G02B 7/28 396/104 |
| 2009/0136091 A1 | 5/2009 | Woodfill et al. |
| 2011/0085790 A1 | 4/2011 | Pace et al. |
| 2011/0142287 A1 | 6/2011 | Wong et al. |
| 2011/0243542 A1 | 10/2011 | Pace et al. |
| 2012/0076361 A1* | 3/2012 | Fujiyoshi ............. G01S 17/89 382/103 |
| 2012/0120283 A1* | 5/2012 | Capata ............. G06K 9/00255 348/241 |
| 2013/0002826 A1 | 1/2013 | Ishiyama et al. |
| 2013/0243241 A1* | 9/2013 | Shaick ............. G06K 9/00261 382/103 |
| 2014/0009665 A1* | 1/2014 | Waitz .................... G02B 7/285 348/350 |
| 2015/0010236 A1* | 1/2015 | Chang .................... G06T 5/003 382/195 |
| 2015/0138427 A1* | 5/2015 | Kennedy ............ H04N 5/23206 348/345 |

FOREIGN PATENT DOCUMENTS

| | | |
|---|---|---|
| EP | 2947510 A1 | 11/2015 |
| EP | 3007096 A1 | 4/2016 |
| JP | 2005167310 A | 6/2005 |
| WO | 9963778 A1 | 12/1999 |

OTHER PUBLICATIONS

International Preliminary Report on Patentability, App. No. PCT/SE2017/050359, dated Feb. 19, 2018, pp. 1-8, Swedish Patent and Registration Office, Stockholm, Sweden, Henrik Andersson.
First Office Action, Chinese Patent Application No. 201780024487.9, dated Mar. 16, 2020, Chinese International Patent Office.
Summary of First Office Action in English for Chinese Patent Application No. 201780024487.9, dated Mar. 16, 2020, Chinese International Patent Office from foreign associate dated Mar. 16, 2020.

* cited by examiner

FOCUS PULLING WITH DISTANCE INFORMATION FROM A SECONDARY CAMERA SYSTEM

FIELD

The present disclosure relates to a method for switching focus between objects found simultaneously in an image area from a main camera used in film production where the focus of the main camera and a switch between different focus distances can be controlled by means of a remote follow focus unit connected to a turning mechanism for controlling the focus of the main camera. A a secondary system and a computer system is used for tracking the distance to at least a first and a second object by measuring the distance to both the first and the second object simultaneously and continuously, which distance information is used by the follow focus unit as a focus distance to set the focus of the main camera on the first object, and to switch the focus of the main camera from the first object to the second object.

The present disclosure also relates to an arrangement for switching focus.

The present disclosure also relates to a computer program product and a computer readable medium whereby an inventive method can be realised.

DESCRIPTION OF BACKGROUND ART

To switch focus from one object to another during a film production is called focus pulling and it is known to provide focus pulling by means of a so called follow focus unit through which it is possible for an operator to control the focus of a camera, set the focus on an object and switch focus from one object to another. Modern follow focus units are handheld remote control units through which a turning mechanism on the camera is controlled, which turning mechanism controls the focus of the camera.

Traditionally the remote follow focus unit has some kind of turning knob where each position on the turning knob corresponds to a setting on the turning mechanism, and where the adjustment of the turning knob will cause a turn and adjustment of the turning mechanism and the focus control on the camera lens.

The operator makes manual measurements of distances from the main camera to different objects that are to be in focus and marks representing different objects and their focus distances are set on the turning knob to enable fast switching between different focus distances.

Each mark represents a setting on the turning knob and the pulling of focus from one mark to another is done manually. Fine tuning is also done manually with the same control.

The manual control enables the possibility to pull fast or slow which gives an artistic freedom to control the pulling process.

It is also known to control the aperture settings of the lens on the main camera by means of the remote control unit and the turning mechanism.

It is known to use a system to measure the distance to objects to be followed by the use of some kind of tag that is placed on the object and detected by the system. Patent publication WO 2015/073916 A2 shows a system for improved camera focusing systems using subject location tags, where the system comprises camera accessories and in-lens technologies that allows for the continuous, automated focus of a subject by measuring the distance between the camera and a subject that has been "tagged" with a locator beacon. It is required that each subject is tagged or marked by a beacon that is visible to the system at all times.

It is a problem to obtain required distance information to pull focus from one object to another and to find focus on the new object with accuracy, that is to find and set focus directly on the new object, even when a follow focus unit is connected to the camera where distances have been measured and are marked on the follow focus unit.

It is a problem to use an automatic system where distances are measured to objects to be followed by means of marking each object with some kind of beacon when objects are moving so that beacons are no longer visible to the system.

It is a problem to use beacons in applications where a shallow depth of field is used in the filming process since focus often is wanted on a person's eye while the beacon may be positioned in another distance as it is placed on a person's clothing or other part of the body.

Depending on the type of beacon, the use of distance measurements to beacons are often limited by lighting conditions and it is a problem to measure accurate distances in conditions such as bright sunlight or dark scenes. Accuracy also gets lower as the distance to the object increases.

It is a problem to provide automatic switching as well as manual switching, and a possibility to freely choose between automatic and manual switching of focus between objects.

It is also a problem to provide a remote follow focus unit that is easily operated and allow a user to hold and operate the control unit over long periods of time.

It is also a problem to provide an aid in manual focus through which an operator can know when he is approaching and finally reaching the correct focus distance.

It is a problem to provide a possibility to fine tune the focus distance to a selected object during filming.

It is also a problem to maintain focus on a moving object once focus has been set.

It is a problem to know distances to different objects and setting focus according to these distances during the filming process.

It is a problem to know distances to several objects, to keep track of these distances when one or several of the objects are movable, and to separate objects from each other while they are moving.

SUMMARY OF THE PRESENT DISCLOSURE

With the purpose of solving one or more of the above mentioned problems, and from the standpoint of a method as described in the field of the present disclosure, it is proposed that the secondary system comprises a secondary camera system and that the computer system produces the distance information by means of images from the secondary camera system.

It is proposed that one camera or a stereo vision camera system is used for the secondary camera system.

It should be mentioned that there are different kinds of stereo vision camera systems for distance measurements and the present disclosure is not limited to any specific stereo vision camera system. Traditionally, two cameras are used in a stereo vision camera system, however, single camera systems are also known to provide stereo vision camera systems.

Patent publication U.S. Pat. No. 6,411,327 B1 describes a number of stereo vision camera systems where only one single camera is used and where some optical arrangement is used whereby two images are produced and captured by the one single camera. The principle of measuring distance by means of two images is the same as for traditional stereo vision camera systems with two cameras but with the difference that the two images are actually captured by one and the same camera.

With the purpose of providing a follow focus unit through which an operator easily can switch focus between different objects, it is proposed that each object is represented by a knob on the follow focus unit, where the method disclosed herein comprises selecting an object by causing a switch of focus to the selected object when a knob representing the selected object is activated.

With the purpose of providing automatic switching as well as manual switching, and a possibility to freely choose between automatic and manual switching of focus between objects, it is proposed that a selector for manual or automatic mode on the follow focus unit can be set to manual switching or automatic switching, where the method described herein comprises performing an automatic of focus when the selector is set to automatic mode, and performing a manual switch of focus when the selector is set to manual mode.

With the purpose of providing an aid in manual focus through which an operator can know when he is approaching and finally reaching the correct focus distance, it is proposed that a focus wheel on the follow focus unit is used to switch focus in the manual mode, where the method described herein comprises providing a tactile response in the focus wheel through which the remote focus unit indicates when the focus distance for selected object is approaching and finally has been reached.

With the purpose of providing a possibility to fine tune the focus distance to a selected object during filming it is proposed that each knob for representing an object is provided with a tuning wheel, where the inventive method comprises providing a manual fine tuning of a focus distance to a selected object by means of the tuning wheel corresponding to the knob representing the selected object.

With the purpose of providing a possibility to fine tune the focus distance to a selected object and maintain focus on a moving object once focus has been set during filming it is proposed that the follow focus unit automatically maintains the selected object in focus by means of information from the continuous distance tracking to the selected object once focus has been set.

With the purpose of providing knowledge of distances to several objects, to keep track of these distances when one or several of the objects are movable, and to separate objects from each other while they are moving it is proposed that an object detection algorithm is used to identify and track the objects, and that the characteristic features of the objects that are to be tracked are identified and stored as positive classifiers to be used by the object detection algorithm.

The method disclosed herein teaches that active use of the method is preceded by an initiating phase where the objects are identified and stored, comprising:
  manually identifying an object,
  identifying and storing at least one characteristic feature of the object as a positive classifier to be used by the object detection algorithm, and
  starting the tracking of the object by means of the characteristic feature,
  where the steps are repeated for each object to be tracked.

It is also proposed that characteristic features of objects that are to be ignored, such as objects that are not to be tracked during the filming process or objects in the background of a scene to be filmed, are identified and stored as negative classifiers to be used by the object detection algorithm in order to improve the object detection algorithm.

Thus the initiating phase may also comprise:
  manually identifying an object to be ignored, and
  identifying and storing at least one characteristic feature of the object to be ignored as a negative classifier to be used by the object detection algorithm,
  where the steps are repeated for selected objects to be ignored.

It is also possible to use previous knowledge of an object and its characteristic features by means of a known set of objects.

Improved performance for the object protection algorithm can be reached by using a training video with positive and/or negative classifiers. Performance can also be improved by learning to recognize the objects as they vary in shape, scale and rotation by applying a training algorithm.

The present disclosure teaches that when the film production is started, or resumed after being paused, it can be made without an initiating phase and with the use of previously stored objects and thereto belonging positive and possibly negative classifiers.

It is proposed that the image from the main camera is presented in real time by means of a graphic user interface, and thereby allowing a user to define the at least first and second object by means of the graphic user interface.

The present disclosure also relates to an arrangement for switching focus between objects found simultaneously in an image area from a main camera used in film production.

The arrangement comprises a remote follow focus unit connected to a turning mechanism adapted to control the focus of the main camera, where the remote follow focus unit is adapted to enable the control of the focus of the main camera and the switch between different focus distances for the main camera.

The arrangement comprises a secondary system and a computer system adapted to track the distance to at least a first and a second object by measuring the distance to both the first and the second object simultaneously and continuously.

The follow focus unit is adapted to receive distance information from the computer system regarding the distance to the first object as a focus distance to set the focus of the main camera on the first object. The follow focus unit is also adapted to receive distance information from the computer system regarding the distance to the second object as a focus distance to enable the switch of focus of the main camera from the first object to the second object.

The present disclosure specifically teaches that the secondary system comprises a secondary camera system, and that the computer system is adapted to produce the distance information from images captured by the secondary camera system.

It is proposed that the secondary camera system comprises one camera or is a stereo vision camera system.

The follow focus unit comprises a knob adapted to represent each object, and the follow focus unit is adapted to switch focus to a selected object as a response to an activation of a knob representing the selected object.

The follow focus unit also comprises a selector for manual or automatic mode adapted to enable the setting of manual switching or automatic switching. The follow focus unit is adapted to perform an automatic switch of focus as a response to that the selector is set on automatic mode, and to perform a manual switch of focus as a response to that the selector is set on manual mode.

The present disclosure teaches that the follow focus unit comprises a focus wheel adapted to be used to switch focus in the manual mode. The focus wheel can be marked with markings represents a setting on the focus wheel and the switching of focus from one object to another can be done by manually pulling the focus wheel from one mark to another. Fine tuning can also done manually with the same control.

The selector for manual or automatic mode can be part of the focus wheel, where the focus wheel is pressed to toggle between manual and automatic mode. An indicator on the remote follow focus unit can show if the selector is set to manual or automatic mode.

It is proposed that the follow focus unit is adapted to provide a tactile response in the focus wheel through which the remote focus unit indicates when the focus distance for selected object is approaching and finally has been reached.

It is proposed that each knob adapted to represent an object is provided with a tuning wheel, and that the remote focus unit is adapted to provide a manual fine tuning of a focus distance to a selected object by means of the tuning wheel corresponding to the knob representing the selected object.

With the purpose of allowing a user to hold and operate the control unit over long periods of time it is proposed that the remote follow focus unit is a hand held unit with a shape that is ergonomically shaped, it is thus proposed that the remote follow focus unit has five knobs for representing objects, one knob for each finger on the hand of an operator, and that these knobs are positioned on the remote follow focus unit so that each knob can be reached by a finger on the hand of an operator.

It is also proposed that the focus wheel is positioned on the remote follow focus unit so that when the remote follow focus unit is held in one hand to operate the knobs for representing objects the focus wheel is easily accessible to the other hand of the operator.

The follow focus unit may be adapted to automatically maintain the selected object in focus by means of information from the continuous distance tracking to the selected object once focus has been set.

The present disclosure teaches that the computer system is adapted to use an object detection algorithm to identify and track the objects, and that the computer system is adapted to identify and store characteristic features of the objects that are to be tracked as positive classifiers to be used by the object detection algorithm.

The computer system may be adapted to perform an initiating phase where the objects are identified and stored, comprising:
  that the computer system is adapted to manual identification of an object,
  that the computer system is adapted to identify and store at least one characteristic feature of the object as a positive classifier to be used by the object detection algorithm, and
  that the computer system is adapted to start the tracking of the object by means of the characteristic feature,
  and that the computer system is adapted to repeat these steps for each object to be tracked as a part of the initiating phase.

The computer system may also be adapted to identify and store characteristic features of objects that are to be ignored, such as objects that are not to be tracked during the filming process or objects in the background of a scene to be filmed, as negative classifiers to be used by the object detection algorithm.

It is thus proposed that the computer system is adapted to manually identify an object to be ignored, that the computer system is adapted to identify and store at least one characteristic feature of the object to be ignored as a negative classifier to be used by the object detection algorithm, and that the computer system is adapted to repeat these steps for selected objects to be ignored as a part of the initiating phase.

The computer system can also be adapted to use previous knowledge of an object and its characteristic features by means of a known set of objects.

It is proposed that the computer system is adapted to use a training video with positive and/or negative classifiers. It may also be adapted to apply a training algorithm to learn to recognize the objects as they vary in shape, scale and rotation.

It is also proposed that the computer system is adapted to start the tracking of objects, or resume the tracking of objects after a pause, with the use of previously stored objects and thereto belonging positive and possibly negative classifiers without an initiating phase.

The inventive arrangement comprises a graphic user interface, the computer system is adapted to present the image from the main camera in real time by means of the graphic user interface, and the graphic user interface is adapted to provide the possibility for a user to define the at least first and second object.

The present disclosure also relates to a remote follow focus unit according to the arrangement disclosed herein.

The present disclosure also relates to a computer program product comprising computer program code, which, when executed by a computing unit, enables the computing unit to perform the steps of the method disclosed herein. The present disclosure also relates to a computer readable medium upon which such computer program code is stored.

The advantages of a method, a system, a computer program product and a computer readable medium according to the present disclosure are that changing focus from one object to another and finding focus on the new object is done with simplicity and accuracy, which will reduce the number of takes that have to be rejected due to out of focus problems. It is done automatically or manually according to the choice of an operator and it is provided without any requirements of markers on the objects to be followed.

The present disclosure provides a possibility to set focus on living objects, such as live persons, and to change focus to an object that have moved when out of focus, where movement of a person changes distance between main camera and object.

The present disclosure provides a possibility to maintain focus on an object, such as a living person, also when the object is moving when in focus.

The present disclosure provides a follow focus unit through which an operator easily can switch focus between different objects, which switching can be performed automatically as well as manually where an operator is free to choose between automatic and manual switching of focus between objects.

The present disclosure provides an aid in manual focusing through which an operator can know when he is approaching and finally reaching the correct focus distance, which will provide a tool for artistic freedom and yet high focus accuracy in a manual focus pulling process.

The present disclosure also provide a possibility to fine tune the focus distance to a selected object during filming and to maintain focus on a moving object once focus has been set.

The present disclosure eliminates to need to manually measure distances to different objects before starting the filming process, instead it provides a simple tool for marking or selecting objects that are to be in focus during different takes of a scene.

The present disclosure also provides a possibility to store knowledge of an object for later use, or to access previous knowledge of an object for use in a film production.

BRIEF DESCRIPTION OF THE DRAWINGS

A method, a system, a computer program product and a computer readable medium according to the present disclosure will now be described in detail with reference to the accompanying drawings, in which.

DESCRIPTION OF EMBODIMENTS AS PRESENTLY PREFERRED

Figure 1:
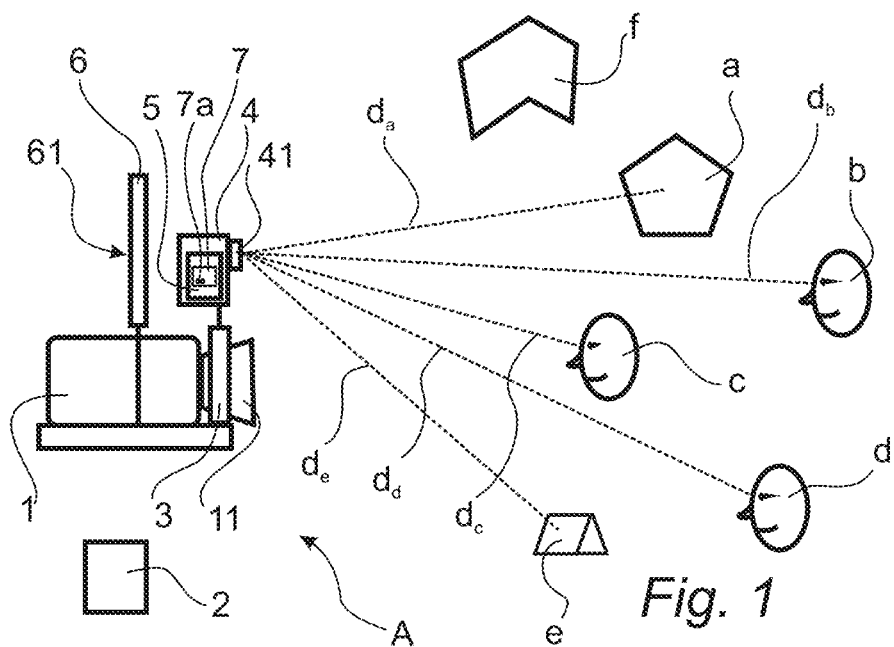
FIG. 1 is a schematic and very simplified illustration of a setup for film production.

The present disclosure will now be described in more detail with reference to FIG. 1 showing a method for switching focus between objects a, b, c, d, e found simultaneously in an image area from a main camera 1 used in film production where the focus of the main camera 1 and a switch between different focus distances $d_a$, $d_b$, $d_c$, $d_d$, $d_e$ can be controlled by means of a remote follow focus unit 2 connected to a turning mechanism 3 adapted to control the lens 11 and focus of the main camera 1.

Figure 2:
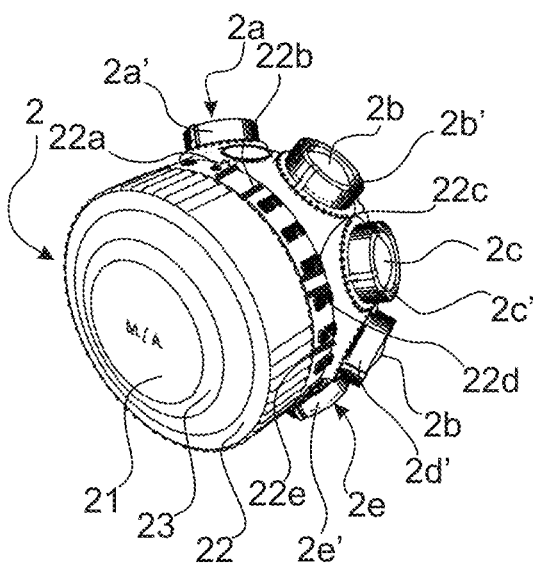
FIG. 2 is a schematic, yet more detailed, illustration of a remote follow focus unit.

The remote follow focus unit is shown schematically in FIG. 1, as is other components, and for clarity reference is also made to FIG. 2 where a remote follow focus unit is shown in more detail.

The method disclosed herein teaches that of a secondary system 4 and a computer system 5 is used for tracking the distance to at least a first and a second object a and b by measuring the distance $d_a$, $d_b$ to both the first and the second object a, b simultaneously and continuously. In the figure, several objects a, b, c, d, e are illustrated and the method disclosed herein is not limited to the number of objects.

The distance information from the secondary system 4 regarding the distance $d_a$ to the first object a is used by the follow focus unit 3 as a focus distance to set the focus of the main camera 1 on the first object a, and the distance information regarding the distance $d_b$ to the second object b is used as a focus distance to switch the focus of the main camera 1 from the first object a to the second object b.

This distance information is thus the information sent to the turning mechanism 3 on the main camera 1 for the setting of the focus control on the lens 11 of the main camera 1.

The present disclosure teaches that the secondary system 4 comprises a secondary camera system 41 and that the method comprises that the computer system 5 produces the distance information by means of images from the secondary camera system 41.

It is proposed that one camera or a stereo vision camera system is used for the secondary camera system 41.

It is proposed that each object a, b, c, d, e is represented by a knob 2a, 2b, 2c, 2d, 2e on the follow focus unit 2, and that the method comprises selecting an object b by causing a switch of focus to the selected object b when a knob 2b representing the selected object b is activated.

It is also proposed that a selector 21 for manual or automatic mode on the follow focus unit 2 can be set to manual switching or automatic switching, and that the method comprises performing an automatic switch of focus when the selector 21 is set to automatic mode, and performing a manual switch of focus when the selector 21 is set to manual mode.

When in manual mode a focus wheel 22 on the follow focus unit 2 is used to switch focus from one object to another, such as from the first object a to the second object b. The method comprises providing a tactile response in the focus wheel 22 through which the remote focus unit 2 indicates when the focus distance $d_b$ for selected object b is approaching and finally has been reached.

The present disclosure teaches that each knob 2a, 2b, 2c, 2d, 2e for representing an object a, b, c, d, e can be provided with a tuning wheel 2a', 2b', 2c', 2d', 2e', and that the method comprises providing a manual fine tuning of a focus distance to a selected object by means of the tuning wheel corresponding to the knob representing the selected object.

The method may also comprise that the follow focus unit 2 automatically maintains the selected object in focus by means of information from the continuous distance tracking to the selected object once focus has been set.

The present disclosure teaches that the method comprises the use of an object detection algorithm to identify and track the objects, and that the characteristic features of the objects that are to be tracked are identified and stored as positive classifiers to be used by the object detection algorithm.

Figure 3:
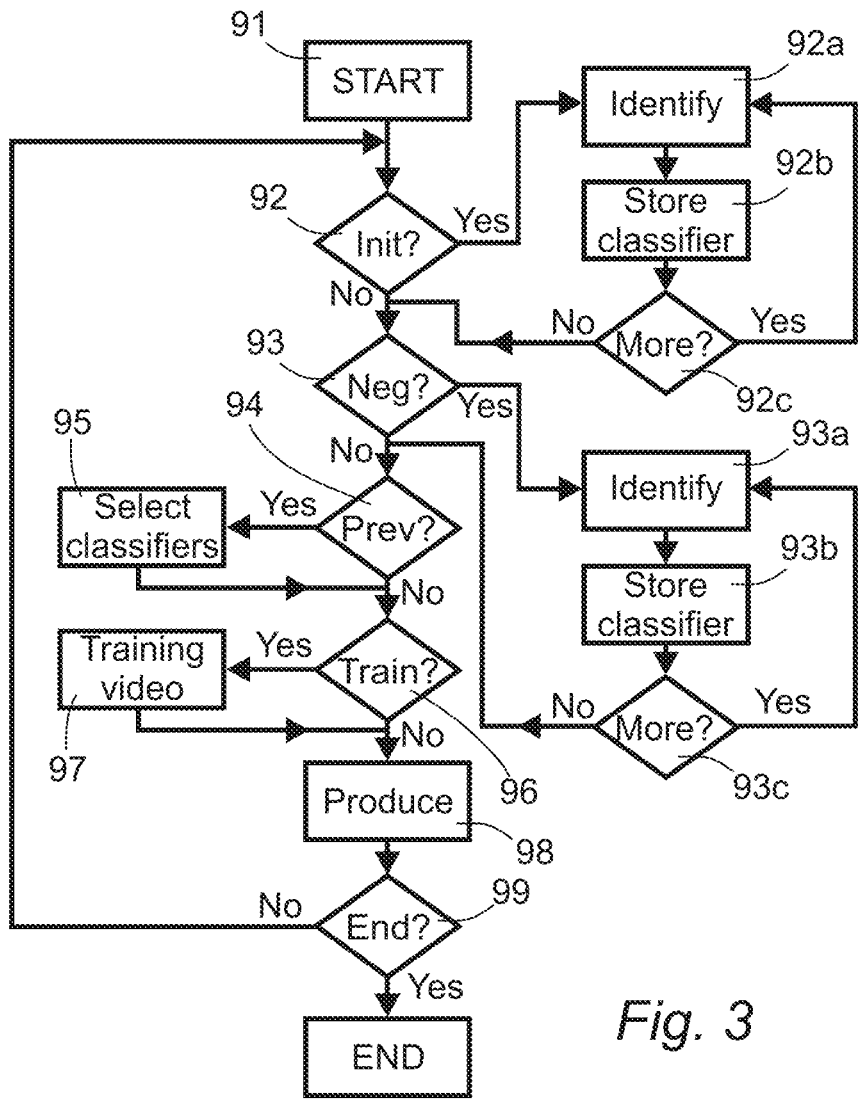
FIG. 3 is a flow chart for the initiating steps of a production.

FIG. 3 illustrates a flow chart showing the method of the present disclosure. After a first start 91 it is possible to choose 92 a manual initiation. If manual initiation is chosen then an initiating phase is started where the objects are identified and stored, which initiating phase comprises:
manually identifying an object 92a, and
identifying and storing at least one characteristic feature of the object as a positive classifier to be used by the object detection algorithm 92b,
where the steps are repeated 92c for each object to be tracked.

With the purpose of enhancing the accuracy of the object detection algorithm of the present disclosure teaches that it is possible to choose 93 that characteristic features of objects that are to be ignored, such as objects that are not to be tracked during the filming process or objects in the background of a scene to be filmed, are identified and stored as negative classifiers to be used by the object detection algorithm.

Thus FIG. 3 also shows that the initiating phase comprises the possibility to choose 93:
manually identifying an object to be ignored 93a, and
identifying and storing at least one characteristic feature of the object to be ignored as a negative classifier to be used by the object detection algorithm 93b,
where the steps are repeated for selected objects to be ignored 93c.

As illustrated in FIG. 3 it is shown that it is possible to select 94 the use of previous knowledge of an object and its characteristic features by means of a known set of objects 95. This knowledge can for instance come from a catalogue of objects and thereto belonging classifiers through which it is possible to select and store both positive and negative classifiers of objects pertinent to the film production. Such catalogue can for instance hold pictures of actors.

It is also possible to select 96 the use of a training video with positive and/or negative classifiers to learn to recognize the objects 97 as they vary in shape, scale and rotation by applying a training algorithm.

The film production 98 can be started, or resumed after being paused 99, without an initiating phase 92 and with the use of previously stored objects 95 and thereto belonging positive and possibly negative classifiers. This knowledge can for instance come from a catalogue of objects and thereto belonging classifiers through which it is possible to select and store both positive and negative classifiers of objects pertinent to the film production.

With renewed reference to FIGS. 1 and 2 it is shown that a user interface 6 for the use of the inventive method can be provided by presenting the image from the main camera 1 in real time by means of a graphic user interface 61, and allowing a user to define the at least first and second object a, b by means of the graphic user interface 61.

The present disclosure also relates to an arrangement A for switching focus between objects a, b, c, d, e found simultaneously in an image area from a main camera 1 used in film production.

The arrangement A comprises a remote follow focus unit 2 connected to a turning mechanism 3 adapted to control the focus of the main camera 1. The remote follow focus unit 2 is adapted to enable the control of the focus of the main camera 1 and the switch between different focus distances $d_a$, $d_b$, $d_c$, $d_d$, $d_e$ for the main camera.

The arrangement A comprises a secondary system 4 and a computer system 5 adapted to track the distance to at least a first and a second object a, b by measuring the distance $d_a$, $d_b$ to both the first and the second object a, b simultaneously and continuously. The number of objects is exemplified by five objects in the figure, the present disclosure is however not limited to a specific number of objects.

The follow focus unit 2 is adapted to receive distance information from the computer system 5 regarding the distance $d_a$ to the first object a as a focus distance to set the focus of the main camera 1 on the first object a, and to receive distance information from the computer system regarding the distance $d_b$ to the second object b as a focus distance in order to enable the switch of focus of the main camera from the first object a to the second object b.

The present disclosure specifically teaches that the secondary system 4 comprises a secondary camera system 41, and that the computer system 5 is adapted to produce the distance information from images captured by the secondary camera system 41. It is proposed that the secondary camera system 41 comprises one camera or is a stereo vision camera system.

The follow focus unit 2 comprises a knob 2a, 2b, 2c, 2d, 2e adapted to represent each object a, b, c, d, e, and the follow focus unit 2 is adapted to switch focus to a selected object b as a response to an activation of a knob 2b representing the selected object b.

The follow focus unit 2 comprises a selector 21 for manual or automatic mode adapted to enable the setting of manual switching or automatic switching. The follow focus unit 2 is adapted to perform an automatic switch of focus as a response to that the selector 21 is set on automatic mode, and perform a manual switch of focus as a response to that the selector 21 is set on manual mode.

The follow focus unit 2 comprises a focus wheel 22 adapted to be used to switch focus in the manual mode. The focus wheel 22 can be marked with markings 22a, 22b, 22c, 22d, 22e representing settings on the focus wheel 22 and the switching of focus from one object a to another b is done by manually pulling the focus wheel 22 from one mark 22a to another 22b. Fine tuning can also done manually with the same control.

The selector 21 for manual or automatic mode can be part of the focus wheel 22, where the focus wheel 22 is pressed to toggle between manual and automatic mode. An indicator 23 on the remote follow focus unit can show if the selector is set to manual or automatic mode. The indicator 23 is in FIG. 2 illustrated as being a ring of light encircling the selector 21 for manual or automatic mode which indicator 23 could indicate manual mode with green light and automatic mode with red light.

The remote follow focus unit 2 can be adapted to provide a tactile response in the focus wheel 22 through which the remote follow focus unit 2 indicates when the focus distance for selected object is approaching and finally has been reached while switching focus in manual mode.

It is proposed that each knob 2a, 2b, 2c, 2d, 2e adapted to represent an object can be provided with a tuning wheel 2a', 2b', 2c', 2d', 2e', and that the remote follow focus unit 2 is adapted to provide a manual fine tuning of a focus distance to a selected object b by means of the tuning wheel 2b' corresponding to the knob 2b representing the selected object b.

It is proposed that the remote follow focus unit 2 is a hand held unit with a shape that is ergonomically shaped in order to allow a user to hold and operate the control unit over long periods of time.

It is also proposed that the remote follow focus unit 2 has five knobs 2a, 2b, 2c, 2d, 2e for representing objects, one knob for each finger on the hand of an operator, and that these knobs are positioned on the remote follow focus unit 2 so that each knob 2a, 2b, 2c, 2d, 2e can be reached by a finger on the hand of an operator.

It is also proposed that the focus wheel 22 is positioned on the remote follow focus unit 2 so that when the remote follow focus unit 22 is held in one hand to operate the knobs 2a, 2b, 2c, 2d, 2e for representing objects a, b, c, d, e the focus wheel 22 is easily accessible to the other hand of the operator.

The remote follow focus unit 2 can be adapted to automatically maintain the selected object b in focus by means of information from the continuous distance tracking to the selected object once focus has been set.

With the purpose of providing a possibility to track different objects it is proposed that the computer system 5 is adapted to use an object detection algorithm to identify and track the objects, and that the computer system 5 is adapted to identify and store characteristic features of the objects that are to be tracked as positive classifiers to be used by the object detection algorithm.

With reference to FIG. 3, it is shown that the computer system 5 can be adapted to perform an initiating phase 92 where the objects are identified and stored, comprising:

that the computer system is adapted to manual identification of an object 92a, and that the computer system is adapted to identify and store at least one characteristic feature of the object as a positive classifier to be used by the object detection algorithm 92b, and that the computer system is adapted to repeat these steps for each object to be tracked as a part of the initiating phase 92c.

The computer system can also be adapted to identify and store characteristic features of objects that are to be ignored 93, such as objects that are not to be tracked during the filming process or objects in the background of a scene to be filmed, as negative classifiers to be used by the object detection algorithm.

It is thus proposed that the computer system is adapted to manually identify an object to be ignored, that the computer system is adapted to identify and store at least one characteristic feature of the object to be ignored 93a as a negative classifier to be used by the object detection algorithm 93b, and that the computer system is adapted to repeat these steps for selected objects to be ignored as a part of the initiating phase 93c.

It is also possible that the computer system is adapted to use previous knowledge of an object and its characteristic features by means of a known set of objects 95, such as a catalogue with pictures of actors.

It is proposed that the computer system is adapted to use a training video with positive and/or negative classifiers where a training algorithm is applied to learn to recognize the objects as they vary in shape, scale and rotation 97.

The computer system can be adapted to start the tracking of objects, or resume the tracking of objects after a pause 99 without an initiating phase with the use of previously stored objects and thereto belonging positive and possibly negative classifiers.

In order to provide a user interface 6 for the inventive arrangement A it is proposed that the arrangement comprises a graphic user interface 61, that the computer system is adapted to present the image from the main camera 1 in real time by means of the graphic user interface 61, and that the graphic user interface 61 is adapted to provide the possibility for a user to define the at least first and second object a, b and to view the results from switching between objects and fine tuning the focus on selected object.

In FIG. 1, the computing unit 5 is a part of the secondary system 4, however, it should be noted that the computing system 5 may be any kind of computer. It can be a part of the remote follow focus unit 2, it can be a part of the secondary system 4, as illustrated in FIG. 1, or it can be a separate mobile computer unit, such as a lap-top, a smart phone, personal assistant or a stationary computer on the set of the film production.

The computing unit 5 comprises, or communicates with, any required data storage for the storage of objects, classifiers pertaining to the objects, values representing produced distance information pertaining to objects, catalogues of previously known objects and thereto belonging classifiers and other information required to manage the inventive method and arrangement.

If the computing unit is not a part of the secondary system 4, then the secondary system 4 and the computing unit 5 are adapted to communicate with each other in order to transmit the images from the stereo camera system 41 to the computing unit 5. If required, this communication is wireless communication.

If the computing unit 5 is not a part of the remote follow focus unit 2, then the computing unit 5 and the follow focus unit 2 are adapted to communicate wirelessly with each other in order to transmit distance information produced by the computing unit 5 to the remote follow focus unit 2.

The secondary camera system 41 is adapted to be mounted on the main camera 1, or at least in the vicinity of the main camera 1, in order to always provide images required to produce the correct distance information.

The graphic user interface 61 can be a on a preview screen of the main camera 1, it can be on a user interface of the computing unit 5, or it can be viewed on a separate screen.

The remote follow focus unit 2 and the turning mechanism 3 for controlling the focus of the main camera 1 are adapted to communicate wirelessly with each other.

The present disclosure also relates to a remote follow focus unit 2 according to the inventive arrangement A. Even though it is not described here it should be understood that the remote follow focus unit of the present disclosure can be adapted to control also other features of the main camera, such as aperture and zoom settings.

The present disclosure also relates to a computer program product 7 comprising computer program code 7a, which, when executed by a computing unit, enables the computing unit to perform the steps of a computing unit 5 in the inventive method.

Figure 4:
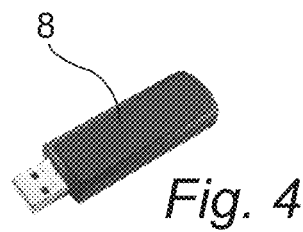
FIG. 4 is an exemplifying embodiment of a computer readable medium.

The present disclosure also relates to a computer readable medium 8, schematically illustrated as a USB-memory in FIG. 4, upon which computer program code 7a according to the inventive computer program product 7 is stored. It should be understood that the computer readable medium can be any kind of computer readable carrier that can carry data and be read by a computer.

It will be understood that the present disclosure is not restricted to the aforedescribed and illustrated exemplifying embodiments thereof and that modifications can be made within the scope of the present disclosure as defined by the accompanying Claims.

The invention claimed is:

1. A method for switching focus between objects (a, b, c, d, e) found simultaneously in an image area from a main camera (1) used in film production where the focus of said main camera and a switch between different focus distances ($d_a$, $d_b$, $d_c$, $d_d$, $d_e$) can be controlled by means of a remote follow focus (2) unit connected to a turning mechanism (3) for controlling the focus of said main camera (1), where a secondary system (4) and a computer system (5) is used for tracking the distance ($d_a$, $d_b$) to at least a first and a second object (a, b) by measuring the distance ($d_a$, $d_b$) to both said first and said second object (a, b) simultaneously and continuously, where distance information from said secondary system (4) regarding the distance ($d_a$) to said first object (a) is used by said follow focus unit (3) as a focus distance to set the focus of said main camera (1) on said first object (a), where the distance information from said secondary system (4) regarding the distance ($d_b$) to said second object (b) is used by said follow focus unit (3) as a focus distance to switch the focus of said main camera (1) from said first object (a) to said second object (b), where said secondary system (4) comprises a secondary camera system (41), such as one camera or a stereo vision camera system, and where said method comprises that said computer system (5) produces said distance information by means of images from said secondary camera system (41), characterized in, that each object (a, b, c, d, e) is represented by a knob (2a, 2b, 2c, 2d, 2e) on said follow focus unit (2), and that said method comprises selecting an object (b) by causing a switch of focus to said selected object (b) when a knob (2b) representing said selected object (b) is activated.

2. A method according to claim 1, characterized in, that a selector (21) for manual or automatic mode on said follow focus unit (2) can be set to manual switching or automatic switching, and that said method comprises performing an automatic switch of focus when said selector (21) is set to automatic mode, and performing a manual switch of focus when said selector (21) is set to manual mode, that a focus wheel (22) on said follow focus unit (2) is used to switch focus in said manual mode, and that said method comprises providing a tactile response in said focus wheel (22) through which said remote focus unit (2) indicates when the focus distance ($d_b$) for selected object (b) is approaching and finally has been reached.

3. A method according to claim 2 characterized in, that each knob (2a, 2b, 2c, 2d, 2e) for representing an object (a, b, c, d, e) is provided with a tuning wheel (2a', 2b', 2c', 2d', 2e'), and that said method comprises providing a manual fine tuning of a focus distance to a selected object by means of the tuning wheel corresponding to the knob representing said selected object.

4. A method according to claim 2 characterized in, said follow focus unit (2) automatically maintaining said selected object in focus by means of information from said continuous distance tracking to said selected object once focus has been set.

5. An arrangement (A) for switching focus between objects (a, b, c, d, e) found simultaneously in an image area from a main camera (1) used in film production, said arrangement (A) comprising a remote follow focus unit (2) connected to a turning mechanism (3) adapted to control the focus of said main camera (1), said remote follow focus unit (2) being adapted to enable the control of the focus of said main camera (1) and the switch between different focus distances ($d_a$, $d_b$, $d_c$, $d_d$, $d_e$) for said main camera (1), where said arrangement (A) comprises a secondary system (4) and a computer system (5), where said computer system (5) and secondary system (4) is adapted to track the distance to at least a first and a second object (a, b) by measuring the distance ($d_a$, $d_b$) to both said first and said second object (a, b) simultaneously and continuously, where said follow focus unit (2) is adapted to receive distance information from said computer system (5) regarding the distance ($d_a$) to said first object (a) as a focus distance to set the focus of said main camera (1) on said first object (a), where said follow focus unit (2) is adapted to receive distance information from said computer system (5) regarding the distance ($d_b$) to said second object (b) as a focus distance to enable the switch of focus of said main camera (1) from said first object (a) to said second object (b), where said secondary system (4) comprises a secondary camera system (41), such as one camera or a stereo vision camera system, and where said computer system, (5) is adapted to produce said distance information from images captured by said secondary camera system (41) characterized in, that said follow focus unit (2) comprises a knob (2a, 2b, 2c, 2d, 2e) adapted to represent each object (a, b, c, d, e), and that said follow focus unit (2) is adapted to switch focus to a selected object as a response to an activation of a knob (2b) representing said selected object (b).

6. An arrangement according to claim 5, characterized in, that said follow focus unit (2) comprises a selector (21) for manual or automatic mode adapted to enable the setting of manual switching or automatic switching, that said follow focus unit (2) is adapted to perform an automatic switch of focus as a response to that said selector (21) is set on automatic mode, and that said follow focus (2) unit is adapted to perform a manual switch of focus as a response to that said selector (21) is set on manual mode, that said follow focus unit (2) comprises a focus wheel (22) adapted to be used to switch focus in said manual mode, that said focus wheel (22) can be marked with markings (22a, 22b, 22c, 22d, 22e) representing a setting on the focus wheel (22), that said follow focus unit (2) is adapted to provide switching of focus from one object (a) to another (b) by manual pulling of said focus wheel (22) from one mark (22a) to another (22b), that said focus wheel (22) comprises said selector (21) for manual or automatic mode, that the focus wheel (22) is adapted to be pressed to toggle said selector (21) between manual and automatic mode, and that said remote follow focus unit (2) comprises an indicator (23) adapted to show if said selector (21) is set to manual or automatic mode.

7. An arrangement according to claim 6, characterized in, that said follow focus unit (2) is adapted to provide a tactile response in said focus wheel (22) through which said remote focus unit (2) indicates when the focus distance for selected object is approaching and finally has been reached.

8. An arrangement according to claim 6, characterized in, that each knob (2a, 2b, 2c, 2d, 2e) adapted to represent an object (a, b, c, d, e) is provided with a tuning wheel (2a', 2b', 2c', 2d', 2e'), and that said remote focus unit 2 is adapted to provide a manual fine tuning of a focus distance to a selected object by means of the tuning wheel (2b') corresponding to the knob (2b) representing said selected object (b).

9. An arrangement according to claim 6, characterized in, said follow focus unit is adapted to automatically maintaining said selected object (b) in focus by means of information from said continuous distance tracking to said selected object once focus has been set.

10. An arrangement according to claim 5, characterized in, that said remote follow focus unit (2) has five knobs (2a, 2b, 2c, 2d, 2e) for representing objects (a, b, c, d, e), one knob for each finger on the hand of an operator, and that said knobs (2a, 2b, 2c, 2d, 2e) are positioned on said remote follow focus unit (2) so that each knob can be reached by a finger on the hand of an operator, and that said focus wheel (22) is positioned on said remote follow focus unit (2) so that when said remote follow focus unit (2) is held in one hand to operate said knobs (2a, 2b, 2c, 2d, 2e) for representing objects said focus wheel (22) is easily accessible to the other hand of said operator.

11. A remote follow focus unit characterized in, that said remote follow focus unit is adapted to function as a remote follow focus unit (2) in an arrangement (A) according to claim 5.

12. A method for switching focus between objects (a, b, c, d, e) found simultaneously in an image area from a main camera (1) used in film production where the focus of said main camera and a switch between different focus distances (da, db, dc, dd, de) can be controlled by means of a remote follow focus (2) unit connected to a turning mechanism (3) for controlling the focus of said main camera (1), characterized in, that each object (a, b, c, d, e) is represented by a knob (2a, 2b, 2c, 2d, 2e) on said follow focus unit (2), and that said method comprises selecting an object (b) by causing a switch of focus to said selected object (b) when a knob (2b) representing said selected object (b) is activated.

13. A method according to claim 12, characterized in, that a selector (21) for manual or automatic mode on said follow focus unit (2) can be set to manual switching or automatic switching, and that said method comprises performing an automatic switch of focus when said selector (21) is set to automatic mode, and performing a manual switch of focus when said selector (21) is set to manual mode, that a focus wheel (22) on said follow focus unit (2) is used to switch focus in said manual mode, and that said method comprises providing a tactile response in said focus wheel (22) through which said remote focus unit (2) indicates when the focus distance (db) for selected object (b) is approaching and finally has been reached.

14. A method according to claim 13 characterized in, that each knob (2a, 2b, 2c, 2d, 2e) for representing an object (a, b, c, d, e) is provided with a tuning wheel (2a', 2b', 2c', 2d', 2e'), and that said method comprises providing a manual fine tuning of a focus distance to a selected object by means of the tuning wheel corresponding to the knob representing said selected object.

15. A method according to claim 13 characterized in, said follow focus unit (2) automatically maintaining said selected object in focus by means of information from said continuous distance tracking to said selected object once focus has been set.

16. A remote follow focus unit (2) for switching focus between objects (a, b, c, d, e) found simultaneously in an image area from a main camera (1) used in film production, said remote follow focus unit (2) being connected to a turning mechanism (3) adapted to control the focus of said main camera (1), said remote follow focus unit (2) being adapted to enable the control of the focus of said main camera (1) and the switch between different focus distances ($d_a$, $d_b$, $d_c$, $d_d$, $d_e$) for said main camera (1), characterized in, that said follow focus unit (2) comprises a knob (2a, 2b, 2c, 2d, 2e) adapted to represent each object (a, b, c, d, e), and that said follow focus unit (2) is adapted to switch focus to a selected object as a response to an activation of a knob (2b) representing said selected object (b).

17. A remote follow focus unit according to claim 16, characterized in, that said follow focus unit (2) comprises a selector (21) for manual or automatic mode adapted to enable the setting of manual switching or automatic switching, that said follow focus unit (2) is adapted to perform an automatic switch of focus as a response to that said selector (21) is set on automatic mode, and that said follow focus (2) unit is adapted to perform a manual switch of focus as a response to that said selector (21) is set on manual mode, that said follow focus unit (2) comprises a focus wheel (22) adapted to be used to switch focus in said manual mode, that said focus wheel (22) can be marked with markings (22a, 22b, 22c, 22d, 22e) representing a setting on the focus wheel (22), that said follow focus unit (2) is adapted to provide switching of focus from one object (a) to another (b) by manual pulling of said focus wheel (22) from one mark (22a) to another (22b), that said focus wheel (22) comprises said selector (21) for manual or automatic mode, that the focus wheel (22) is adapted to be pressed to toggle said selector (21) between manual and automatic mode, and that said remote follow focus unit (2) comprises an indicator (23) adapted to show if said selector (21) is set to manual or automatic mode.

18. A remote follow focus unit according to claim 17, characterized in, that said follow focus unit (2) is adapted to provide a tactile response in said focus wheel (22) through which said remote focus unit (2) indicates when the focus distance for selected object is approaching and finally has been reached.

19. A remote follow focus unit according to claim 17, characterized in, that each knob (2a, 2b, 2c, 2d, 2e) adapted to represent an object (a, b, c, d, e) is provided with a tuning wheel (2a', 2b', 2c', 2d', 2e'), and that said remote focus unit 2 is adapted to provide a manual fine tuning of a focus distance to a selected object by means of the tuning wheel (2b') corresponding to the knob (2b) representing said selected object (b).

20. A remote follow focus unit according to claim 17, characterized in, said follow focus unit is adapted to automatically maintaining said selected object (b) in focus by means of information from said continuous distance tracking to said selected object once focus has been set.

21. A remote follow focus unit according to claim 16, characterized in, that said remote follow focus unit (2) has five knobs (2a, 2b, 2c, 2d, 2e) for representing objects (a, b, c, d, e), one knob for each finger on the hand of an operator, and that said knobs (2a, 2b, 2c, 2d, 2e) are positioned on said remote follow focus unit (2) so that each knob can be reached by a finger on the hand of an operator, and that said focus wheel (22) is positioned on said remote follow focus unit (2) so that when said remote follow focus unit (2) is held in one hand to operate said knobs (2a, 2b, 2c, 2d, 2e) for representing objects said focus wheel (22) is easily accessible to the other hand of said operator.

22. A remote follow focus unit according to claim 16, characterized in that said follow focus unit (2) is connected to a secondary system (4) and a computer system (5), that said computer system (5) and secondary system (4) is adapted to track the distance to at least a first and a second object (a, b) by measuring the distance (da, db) to both said first and said second object (a, b) simultaneously and continuously, that said follow focus unit (2) is adapted to receive distance information from said computer system (5) regarding the distance (da) to said first object (a) as a focus distance to set the focus of said main camera (1) on said first object (a), that said follow focus unit (2) is adapted to receive distance information from said computer system (5) regarding the distance (db) to said second object (b) as a focus distance to enable the switch of focus of said main camera (1) from said first object (a) to said second object (b), and that said secondary system (4) comprises a secondary camera system (41), such as one camera or a stereo vision camera system, and that said computer system, (5) is adapted to produce said distance information from images captured by said secondary camera system (41).

* * * * *